United States Patent [19]

Silver

[11] 4,207,485

[45] Jun. 10, 1980

[54] MAGNETIC COUPLING

[75] Inventor: Alexander Silver, Tarzana, Calif.

[73] Assignee: The Garrett Corporation, Los Angeles, Calif.

[21] Appl. No.: 899,668

[22] Filed: Apr. 24, 1978

[51] Int. Cl.² .................. H02K 5/00; H02K 49/00
[52] U.S. Cl. .................. 310/104; 310/60 R; 417/366; 417/420
[58] Field of Search .......... 417/420, 366; 310/90, 310/54, 55, 56, 104, 103, 60 R, 61, 60 A

[56] References Cited

U.S. PATENT DOCUMENTS

| | | | |
|---|---|---|---|
| 3,732,445 | 5/1973 | Laing | 417/420 X |
| 4,013,384 | 3/1977 | Oikawa | 417/420 X |
| 4,047,847 | 9/1977 | Oikawa | 417/420 X |
| 4,080,112 | 3/1978 | Zimmerman | 417/420 |

Primary Examiner—Donovan F. Duggan
Attorney, Agent, or Firm—Albert J. Miller; Joel D. Talcott; Stuart O. Lowry

[57] ABSTRACT

A permanent magnet coupling having opposed magnetic coupling members, and including process fluid bearings and dual flow paths for process fluid providing temperature control.

28 Claims, 5 Drawing Figures

MAGNETIC COUPLING

BACKGROUND OF THE INVENTION

This invention relates to magnetic couplings. More specifically, this invention relates to radially interfitting magnetic members for coupling rotational movement through a hermetically sealed wall or barrier.

Permanent magnet couplings in general are well known in the prior art. Typically, permanent magnet couplings comprise a pair of axially or radially opposed magnets, or sets of mangets, formed from a permanent magnet material such as alnico. One of the permanent magnets is coupled to a driving member such as a motor, and the other permanent magnet is coupled to a driven member such as a pump impeller. The magnets are magnetically coupled to each other so that rotation of the driving member causes a corresponding rotation of the driven member to obtain the desired torque output. Couplings of this type are particularly advantageous wherein a hermetic seal or barrier is interposed between the driving and driven members, such as in a motor-driven freon compressor. In these applications, the hermetic seal assures against passage or leakage of any process fluid between the driving and driven members, and thereby prolongs the operating life of the equipment. For examples of prior art magnetic couplings, including hermetic seals or barriers, see U.S. Pat. Nos. 3,877,844; 3,826,938; 3,411,450; 3,512,903; 3,378,710; 3,249,777; 3,238,883; 3,238,878; 3,195,467; 2,970,548; 2,366,562; 2,230,717 and U.S. Pat. No. 26,094.

During operation, a magnetic coupling may generate substantial quantitites of heat due to relative slippage of the magnets at excessive torque loads, induction heating effects, and the like. This is particularly true with closely aligned, radially interfitting permanent magnets rotating at relatively high speeds. Accordingly, in the prior art, magnetic couplings typically have not been used with mechanical devices rotating at relatively high speeds so as to avoid any cooling requirement. However, some attempts to cool a magnetic coupling have been made, and have comprised methods of exposing at least a portion of one of the magnets to a cooling fluid. See, for example, U.S. Pat. Nos. 3,238,883; 3,238,878; and 3,267,868. These prior art devices do not, however, provide the requisite pumping or cooling action when the coupling is used with relatively high speed machinery such as turbomachinery wherein the coupling is required to rotate at speeds of on the order of about 50,000 r.p.m. or more.

Prior art magnetic couplings have also encountered bearing design problems. That is, with low speed rotating devices, magnet-carrying shafts may be satisfactorily supported by relatively simple journal and thrust bearing structures such as sleeve bearings, ball bearings, and the like. However, as rotational speed increases, the problems of shaft stability and vibration correspondingly increase to create bearing design and cooling problems. Moreover, with increased speed, the adverse effects on the system due to incidental bearing magnetization and induction heating become substantial. However, the prior art has consistently relied upon relatively conventional bearing structures for shaft support, and not upon so-called process fluid bearings such as hydrodynamic or foil bearings. See, for example, U.S. Pat. Nos. 3,512,903; 3,378,710; 3,195,467; 3,238,878; 2,970,548 and 2,366,562. Accordingly, permanent magnet couplings have not been widely or satisfactorily used in high speed applications.

This invention overcomes the problems and disadvantages of the prior art by providing an improved permanent magnet coupling particularly for use with relatively high speed rotating machinery. In particular, the invention includes dual process fluid cooling paths for circulating process fluid to control the temperature of the coupling magnets, and high speed process fluid bearings for supporting the rotating shafts at high speeds.

SUMMARY OF THE INVENTION

In accordance with the invention, a permanent magnet coupling comprises interfitting driving and driven members each with at least one axially elongated permanent magnet. The driving member includes a shaft coupled to driving means, such as a motor, and extending toward a hermetically sealed wall. The shaft terminates in a generally cup-shaped configuration with a central axial extension. An axially elongated ring magnet is suitably retained within a recess on the radially inner extent of the cup member, and the hermetically sealed wall is configured to closely conform with the surface configuration of the driving cup member and axial extension.

The driven member comprises a generally cup-shaped member received concentrically within the driving cup member and concentrically over the axial extension on the opposite side of the hermetically sealed wall. The driven cup member includes a ring magnet suitably carried and retained in a recess formed on the radially outer extent thereof, and aligned for magnetic coupling through the sealed wall with the permanent magnet on the driving member. The driven cup member is coupled to a driven shaft axially aligned with the driving shaft and coupled to suitable work output means such as a pump impeller.

The driving shaft and the driven shaft each include a longitudinally extending bore in open communication with the hermetically sealed wall, and communicating with process fluid via a pair of radially extending opposed ports. More specifically, in one embodiment of the invention, the driving shaft bore communicates via the ports to a process fluid such as air or oil, and the driven shaft bore communicates via the ports to a process fluid such as freon. In operation, the process fluid encompassing the respective rotating driving or driven member is centrifugally pumped between the associated coupling member and the sealed wall, through the shaft bore, and back to the region of process fluid through the shaft ports. With this pumping action, the coupling members and shafts are conveniently supported for rotation by process fluid thrust and/or journal bearings, such as foil bearings, which are suitably lubricated by the circulating process fluid.

BRIEF DESCRIPTION OF THE DRAWINGS

The accompanying drawings illustrate the invention. In such drawings.

DETAILED DESCRIPTION OF THE PREFERRED EMBODIMENT

Figure 1:
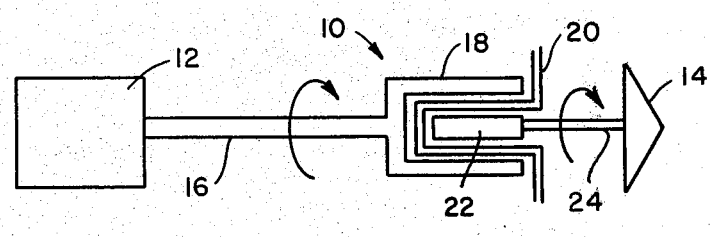
FIG. 1 is a schematic illustration of a magnetic coupling.
Figure 3:
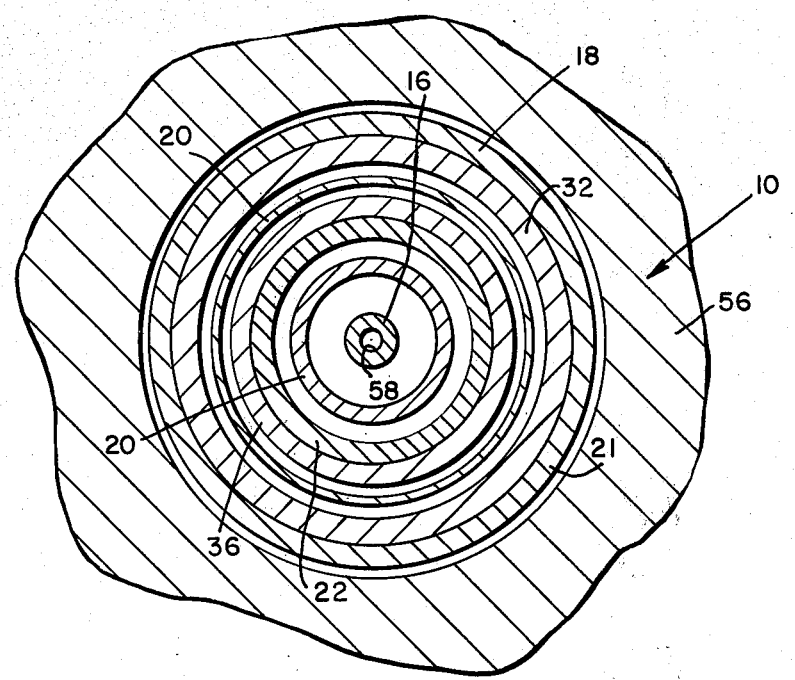
FIG. 3 is an enlarged fragmented vertical section taken on the line 3—3 of FIG. 2.
Figure 4:
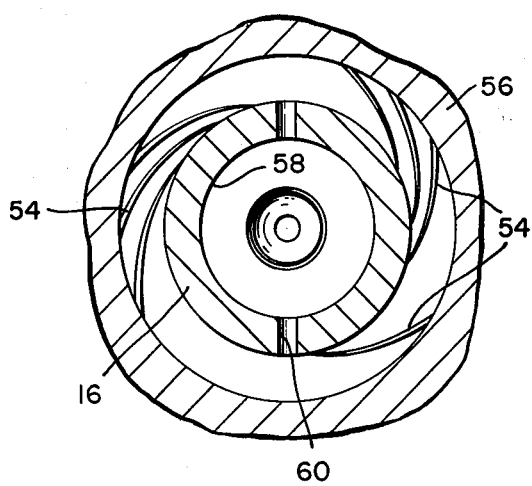
FIG. 4 is an enlarged fragmented vertical section taken on the line 4—4 of FIG. 2.
Figure 5:
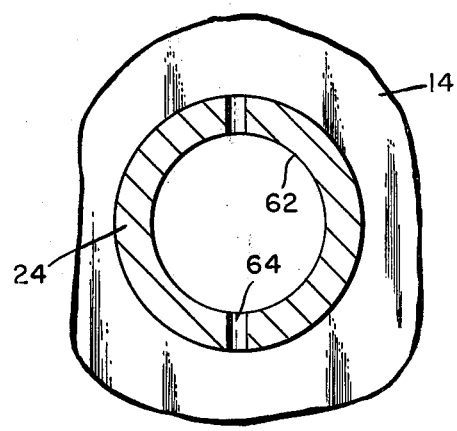
FIG. 5 is an enlarged fragmented vertical section taken on the line 5—5 of FIG. 2.

A permanent magnet coupling 10 is shown generally in FIG. 1 comprising a contact-free torque coupling between a suitable driving motor 12 and a driven work output device 14 such as a freon compressor impeller. As shown, the motor 12 rotatably drives a driving shaft 16 which in turn rotates a generally cup-shaped outer magnetic coupling member 18. The outer coupling member 18 is magnetically coupled through a hermetically sealed wall to an inner driven magnetic coupling member 22 for rotation of a driven shaft 24. Thus, rotation of the driving shaft 16 causes corresponding rotation of the driven shaft 24 and the impeller 14, with the hermetically sealed wall 20 providing a positive leak-free barrier between driving and driven members 18 and 22. Importantly, it should be understood that the invention is applicable to a wide variety of applications wherein it is desired to magnetically couple driving and driven elements through a hermetic barrier, and no specific motor 12 or work output device 14 is contemplated. Moreover, the outer and inner coupling members 18 and 22 may be reversed so that the outer member 18 is coupled to the work output device 14, and the inner member 22 is coupled to the motor 12.

The magnetic coupling 10 of this invention is shown in greater detail in FIGS. 2-5. As shown, the motor 12 is coupled by a suitable fitting 26 to one end of the driving shaft 16. The driving shaft 16 extends from the motor toward the hermetically sealed wall 20, and is preferably formed integrally as shown with the generally cup-shaped outer coupling member 18 including a base 19 and an axially extending cylindrical wall 21. Specifically, the shaft 16 blends into the coupling member 18, and projects beyond the base 19 to form an axially projecting central extension 28. Importantly, the coupling member 18 includes a circumferential recess 30 on the radially inner surface of the wall 21 for suitable reception and mounting of a permanent magnet 32. As shown, the permanent magnet 32 comprises an axially elongated ring magnet which may be formed from a suitable permanent magnet material such as alnico or the like. Alternately, if desired, the permanent magnet 32 may be formed from any of a wide variety of permanent magnet materials, and may include a series of axially extending permanent magnets circumferentially retained within the recess 30 of the coupling member 18.

The driven shaft 24 is coupled at one end to the impeller 14 as by a nut 34, and extends therefrom toward the hermetically sealed wall 20. As shown, the driven shaft 24 is joined, preferably integrally, to the inner coupling member 22. The inner coupling member 22 is also generally cup-shaped, and is shaped for close concentric disposition within the outer member 18 and about the central axial extension 28. The inner coupling member 22 includes a circumferential, axially extending recess 35 on its radially outer surface for suitable mounting and retention of an inner ring magnet 36. Importantly, this inner ring magnet generally corresponds magnetically with the characteristics of the outer ring magnet 32, and is aligned for close magnetic coupling with said outer magnet 32. Again, if desired, the inner magnet 36 may be formed from any of a wide variety of permanent magnet materials, and may comprise a plurality of axially elongated magnets suitably retained about the circumference of the coupling member 22.

The hermetically sealed wall 20 is configured to interfit closely between the outer and inner coupling members 18 and 22. That is, as shown, the wall 20 provides an uninterrupted sealing barrier between the opposed outer and inner magnets 32 and 36, and between the interior of the inner coupling member 22 and the axial extension 28 of the outer coupling member 18. In practice, the hermetically sealed wall 20 may be formed from any of a wide variety of materials such as stainless steel, or an electrically resistive material such as a ceramic. Of course, in any given application, the wall 20 must be impervious to the associated process fluids on opposite sides thereof, and capable of withstanding the operating pressures of the fluids.

Figure 2:
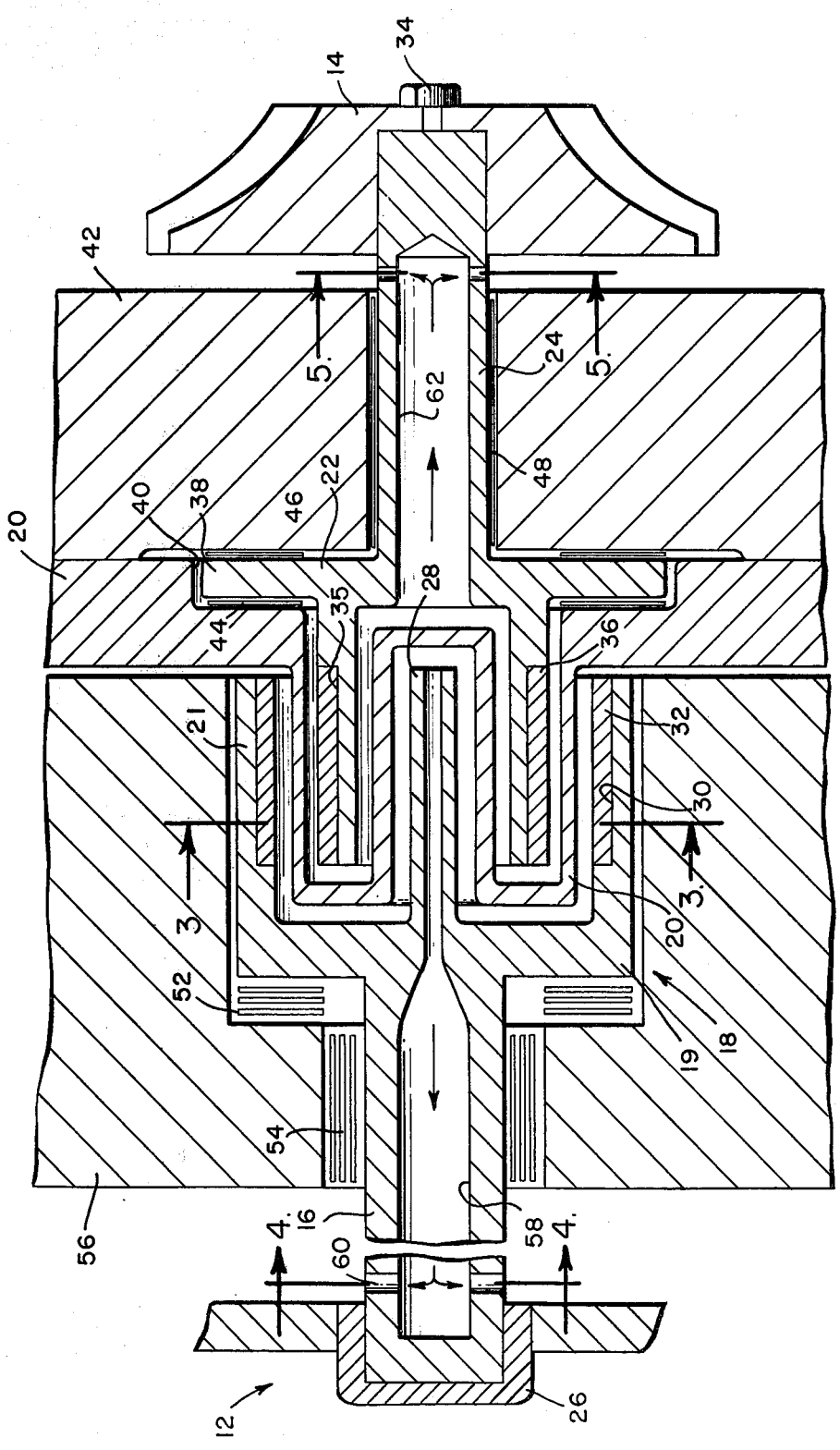
FIG. 2 is an enlarged fragmented vertical section of a permanent magnet coupling of the invention.

As shown in FIG. 2, the cup-shaped inner coupling member 22 includes at its base a radially outwardly projecting peripheral flange 38. The flange 38 comprises a thrust collar received in an annular recess 40 formed between the hermetically sealed wall 20 and a support wall 42 which suitably encloses the impeller 14. The flange 38 is separated from the sealed wall 20 and the support wall 42 by sets of process fluid thrust bearings 44 and 46, respectively. From the flange 38, the driven shaft 24 extends through the support wall 42 toward the impeller 14, and is supported for rotation with respect to the support wall by a series of process fluid journal bearings 48. In the preferred embodiment, these process fluid bearings 44, 46, and 48 comprise hydrodynamic bearings generally of the foil bearing type as disclosed and described in U.S. Pat. Nos. 3,215,480; 3,366,427; 3,375,046; 3,382,014; 3,434,762; 3,615,121; 3,635,534; 3,642,331; 3,677,612; 3,89_,733; 3,951,474 and 3,957,317, all assigned to the assignee of this application. The specific construction and mounting of these process fluid bearings is believed to be well documented by the referenced patents, and therefore is not described in detail herein.

The driving shaft 16 and the outer coupling member 18 are also desirably supported for relatively high speed rotation by suitable process fluid thrust and journal bearings 52 and 54, respectively. That is, as shown, the driving shaft 16 and outer coupling member 18 extend through a support wall 56 provided for enclosing the motor 12. The process fluid thrust bearing 52 is interposed between the base 19 of the outer coupling member 18 and the wall 56 so as to control axial movement, and the shaft 16 is supported by the process fluid journal bearings 54 carried by said wall 56. Importantly, in the preferred embodiment, these process fluid bearings 52 and 54 also comprise hydrodynamic bearings generally of the foil bearing type as disclosed and described in the above-referenced U.S. patents.

The driving and driven shafts 16 and 24, and the outer and inner coupling members 18 and 22, include process fluid cooling paths for controlling the temperature of the permanent magnets 32 and 36, as well as to provide pressurized process fluid to the process fluid bearings. Specifically, the driving shaft 16 includes a longitudinally extending bore 58 extending from near the motor 12 through the axial extension 28 and opening to communication with the hermetically sealed wall 20. A pair of outwardly radiating process fluid ports 60 open into the bore 58 in a region of process fluid between the support wall 56 and the motor 12. When the driving shaft 16 is rotated, the process fluid, which may be oil, air, or the like, is pumped centrifugally out of the bore 58 through the ports 60 into the process fluid region. This causes the process fluid to be drawn through the process fluid bearings 54 and 52, and further across the surfaces of the outer coupling member 18, the outer magnet 32, and the hermetically sealed wall 20 into the bore 58. In this manner, the bearings 54 and 52 are effectively lubricated, and heat generated by the coupling 10 is effectively carried away to allow relatively high speed coupling operation.

In a similar manner, the driven shaft 24 includes a longitudinally extending bore 62 extending from near the impeller 14 into communication with the associated side of the hermetically sealed wall 20. A pair of outwardly radiating process fluid ports 64 open into the bore 62 in a region of process fluid, such as freon, between the support wall 42 and the impeller 14. When the driven shaft 24 is caused to rotate, the process fluid is pumped centrifugally out of the bore 62 through the ports 64 into the region of process fluid. This correspondingly causes the process fluid to be drawn through the process fluid bearings 48, 46, and 44, and further across the surfaces of the inner coupling member 22, the inner magnet 36, and the hermetically sealed wall 20 into the bore 62. Thus, the bearings 48, 46 and 44 are also effectively lubricated, and additional cooling for the coupling 10 is provided.

The central extension 28 of the outer coupling member 18 serves to elongate the flow path of process fluid on both sides of the sealed wall 20, thereby enables improved cooling of the inner and outer magnets 36 and 32. That is, the central extension 28 requires that the inner coupling member 22 also be generally cup-shaped along with the outer member 18. In this manner, the central extension 28 and the concentrically interfitting cup-shaped coupling members combine with the matingly configured sealed wall 20 to provide elongated, tortuous process fluid flow paths. Specifically, the flow path on each side of the sealed wall follows along both the radially inner and radially outer extent of both of the magnets 32 and 36. Moreover, the flow paths are elongated adjacent to each other on opposite sides of the wall to allow substantial heat exchange communication therebetween.

The permanent magnet coupling 10 of this invention is operable under relatively high torque loads at relatively high rotational speeds, such as on the order of about 50,000 r.p.m. or more, without incurring adverse bearing or heating problems. The dual process fluid flow paths, and the use and location of the process fluid bearings insure substantially trouble-free, high speed operation. Of course, various modifications of the invention are possible, but are believed to be within the skill of the art. Accordingly, no limitation of the invention is intended except by way of the appended claims.

What is claimed is:

1. A magnetic coupling for coupling rotational motion through a sealed wall comprising rotatable driving means on one side of the wall and including first magnetic means thereon; and rotatable driven means on the side of the wall opposite said driving means and including thereon second magnetic means in magnetic coupling relation with said first magnetic means, each of said rotatable means being disposed in a respective region of process fluid and each including axial and radial passages for centrifugally establishing circulation of the associated process fluid over the magnetic means thereon.

2. A magnetic coupling as set forth in claim 1 wherein one of said rotatable means comprises an outer coupling member and the other of said rotatable means comprises an inner coupling member, said outer member being axially received over said inner member in concentrically spaced relation therewith, said wall being configured to fit concentrically between and in spaced relation with said outer and inner members.

3. A magnetic coupling as set forth in claim 2 wherein said driving means comprises the outer coupling member, and said driven means comprises the inner coupling member.

4. A magnetic coupling as set forth in claim 2 wherein said first and second magnetic means comprise first and second ring magnets, respectively.

5. A magnetic coupling as set forth in claim 1 wherein said process fluid bearings comprise foil bearings.

6. A magnetic coupling as set forth in claim 1 wherein the axial and radial passages of each of said rotatable means comprise a longitudinally extending central bore communicating between the wall and at least one outwardly radiating port formed on the side of the associated magnetic means opposite the wall whereby, upon rotation, process fluid is pumped centrifugally out of the bore through the port to cause process fluid circulation over the associated magnetic means and into the bore.

7. A magnetic coupling as set forth in claim 1 including process fluid bearings for supporting each of said rotatable means, said port of each rotatable means being formed on the side of the associated magnetic means and bearings opposite the wall whereby, upon rotation, process fluid is pumped centrifugally out of the bore of each rotatable means and through the associated port to cause circulation over the corresponding bearings and magnetic means.

8. A magnetic coupling as set forth in claim 1 wherein one of said rotatable means comprises a shaft, a cup-shaped outer member connected to said shaft and carrying the associated magnetic means, and an axially elongated central extension within said cup-shaped outer member and projecting toward the wall, said axial passage being formed through said extension and a portion of said shaft and said radial passage being formed in said shaft disposed in a region of a process fluid, said other rotatable means being formed for concentric reception within said outer member and over said extension, and said wall being configured to fit in spaced relation between said first and second coupling means.

9. A magnetic coupling for coupling rotational motion through a sealed wall comprising rotatable driving means disposed in a region of a first process fluid on one side of the wall and including first magnetic means, said driving means having formed therein a longitudinally extending central bore communicating between the wall and at least one outwardly radiating port formed therein on the side of said first magnetic means opposite the wall; and rotatable driven means disposed in a region of a second process fluid on the other side of the wall axially aligned with said driving means and including second magnetic means in magnetic coupling relation with said first magnetic means, said driven means having formed therein a longitudinally extending central bore communicating between the wall and at least one outwardly radiating port formed therein on the side of said second magnetic means opposite the wall whereby, upon rotation, the respective process fluids are pumped centrifugally out of the associated bores through the ports to cause fluid circulation over the associated magnetic means and into the bores.

10. A magnetic coupling as set forth in claim 9 including first and second process fluid bearings for respectively supporting said driving and driven means, said ports in said driving and driven means being disposed so that, upon rotation, the respective process fluids are pumped over the associated bearings and magnetic means into the respective bores.

11. A magnetic coupling as set forth in claim 10 wherein said first and second process fluid bearings comprise foil bearings.

12. A magnetic coupling as set forth in claim 9 wherein one of said rotatable means comprises a shaft, a cup-shaped outer member connected to said shaft and carrying said first magnetic means, and an axially elongated extension within said cup-shaped outer member and projecting toward the wall, said bore in said one rotatable means being formed to extend through said extension and a portion of said shaft; and said other rotatable means comprises a shaft, a cup-shaped inner member connected to said shaft and carrying said second magnetic means, said inner member being received concentrically within said outer member and concentrically about said axial extension, said wall being configured to fit in spaced relation between said outer and inner coupling members.

13. A magnetic coupling for coupling rotational motion through a sealed wall comprising rotatable driving means disposed in a region of a first process fluid on one side of the wall and including first magnetic means, said driving means having formed therein a longitudinally extending central bore communicating between the wall and at least one outwardly radiating port formed therein on the side of said first magnetic means opposite the wall; first process fluid bearing means between the wall and said port for supporting said rotatable driving means; rotatable driven means disposed in a region of a second process fluid on the other side of the wall axially aligned with said driving means and including second magnetic means in magnetic coupling relation with said first magnetic means, said driven means having formed therein a longitudinally extending central bore communicating between the wall and at least one outwardly radiating port formed therein on the side of said second magnetic means opposite the wall; and second process fluid bearing means between the wall and the port on said driven means for supporting said driven means whereby, upon rotation, the respective process fluids are pumped centrifugally out of the associated bores through the ports to cause fluid circulation over the associated magnetic means and process fluid bearing means and into the bores.

14. A magnetic coupling as set forth in claim 13 wherein one of said rotatable means comprises a shaft, a cup-shaped outer member connected to said shaft and carrying said first magnetic means, and an axially elongated extension within said cup-shaped outer member and projecting toward the wall, said bore in said one rotatable means being formed to extend through said extension, and a portion of said shaft; and said other rotatable means comprises a shaft, a cup-shaped inner member connected to said shaft and carrying said second magnetic means, said inner member being received concentrically within said outer member and concentrically about said axial extension, said wall being configured to fit in spaced relation between said outer and inner coupling members.

15. A magnetic coupling for coupling rotational motion through a sealed wall comprising a first shaft connected to a cup-shaped outer member carrying first magnetic means, all disposed on one side of the wall within a region of a first process fluid, said outer member including an axially elongated extension projecting toward the wall, and having formed therein a longitudinally extending central bore communicating between the wall and at least one outwardly radiating port formed in said first shaft at a position on the side of said first magnetic means opposite the wall; and a second shaft connected to a cup-shaped inner member carrying second magnetic means disposed in a region of a second process fluid with said second magnetic means in magnetic coupling relation with said first magnetic means, said inner member being shaped for concentric reception within said outer member and about said extension, and having formed therein a longitudinally extending central bore communicating between the wall and at least one outwardly radiating port formed in said second shaft at a position on the side of said second magnetic means opposite the wall, whereby upon rotation, the respective process fluids are pumped centrifugally out of the associated bores through the ports to cause fluid circulation over the associated magnetic means and into the bores.

16. A magnetic coupling as set forth in claim 15 including first process fluid bearing means for supporting said outer member; and second process fluid bearing means for supporting said inner member whereby, upon rotation of said inner and outer members, the respective process fluids are pumped centrifugally out of the associated bores through the ports to cause fluid circulation over the respective inner and outer members and process fluid bearing means into the bores.

17. A method of magnetically coupling rotational motion through a sealed wall comprising the steps of positioning rotatable driving means including first magnetic means on one side of the wall; positioning rotatable driven means including second magnetic means on the other side of the wall in axial alignment with said driving means and in magnetic coupling relation with said first magnetic means; and positioning each of said rotatable means in a respective region of process fluid, and forming axial and radial passages in each of said rotatable means for centrifugally establishing circulation of the associated process fluid over the magnetic means thereon.

18. The method of claim 17 including the steps of concentrically receiving said driving member about said driven member, and configuring the sealed wall for concentric reception between said driving and driven members in spaced relation therewith.

19. The method of claim 17 wherein said step of forming said axial and radial passages comprises the steps of forming a longitudinally extending central bore communicating between the wall and at least one outwardly radiating port formed on the side of the associated magnetic means opposite the wall whereby, upon rotation, process fluid is pumped centrifugally out of the bore through the port to cause process fluid circulation over the associated magnetic means and into the bore.

20. The method of claim 19 including the steps of supporting each of said rotatable means with process fluid bearings disposed between said port and said wall whereby fluid circulates over said bearings and the associated magnetic means into the bore.

21. The method of claim 20 wherein said supporting step includes supporting each of said rotatable means with foil bearings.

22. The method of claim 19 wherein the step of forming the outwardly radiating port comprises forming a pair of generally opposed, outwardly radiating ports.

23. The method of claim 17 including the steps of forming said driving means to include a cup-shaped outer member with an axially elongated central extension projecting toward the wall and forming said rotatable driven means to include a cup-shaped inner member for concentric reception within said outer member and about said extension.

24. A method of magnetically coupling rotational motion through a sealed wall comprising the steps of positioning rotatable driving means including first magnetic means on one side of the wall in a region of a process fluid; forming an outwardly radiating port in said driving means on the side of the first magnetic means opposite the wall, and a longitudinally extending central bore communicating between the wall and said port; positioning rotatable driven means including second magnetic means in a region of another process fluid on the other side of the wall in axial alignment with said driving means and in magnetic coupling relation with said first magnetic means; and forming an outwardly radiating port in said driven means on the side of the second magnetic means opposite the wall and a longitudinally extending central bore communicating between the port in said driven means and the wall whereby, upon rotation, the process fluids are pumped centrifugally out of the associated bores through the respective ports to cause fluid circulation over the associated magnetic means and into the bores.

25. The method of claim 24 including the step of respectively supporting said driving and driven means with first and second process fluid bearings each disposed between the wall and the associated port so that fluid circulates over the respective process fluid bearings and magnetic means into the bores.

26. A method of magnetically coupling rotational motion through a sealed wall comprising the steps of positioning rotatable driving means including first magnetic means on one side of the wall in a region of a process fluid; forming an outwardly radiating port in said driving means on the side of the first magnetic means opposite the wall, and a longitudinally extending central bore communicating between the wall and said port; positioning rotatable driven means including second magnetic means in a region of another process fluid on the other side of the wall in axial alignment with said driving means and in magnetic coupling relation with said first magnetic means; forming an outwardly radiating port in said driven means on the side of the second magnetic means opposite the wall, and a longitudinally extending central bore communicating between the port in said driven means and the wall; and supporting said driving and driven members with first and second process fluid bearings respectively disposed between the wall and the adjacent port whereby, upon rotation, the process fluids are centrifugally pumped out of the associated bores through the respective ports to cause fluid circulation over the associated magnetic means and process fluid bearings into the bores.

27. A method of magnetically coupling rotational motion through a sealed wall comprising the steps of positioning driving means including first magnetic means on a cup-shaped outer member having an axially elongated central extension on one side of the wall in a region of a first process fluid; forming an outwardly radiating port in said driving means on the side of the first magnetic means opposite the wall, and a longitudinally extending central bore communicating between the wall and said port; positioning driven means including second magnetic means on a cup-shaped inner member in a region of a second process fluid on the other side of the wall in magnetically coupled relation with said first magnetic means with the inner member concentrically received within said outer member and about said extension; and forming an outwardly radiating port in said driven means on the side of the second magnetic means opposite the wall, and a longitudinally extending central bore communicating between the port in said driven means and the wall whereby, upon rotation, the process fluids are pumped centrifugally out of the associated bores through the respective ports to cause fluid circulation over the associated magnetic means and into the bores.

28. The method of claim 27 including the step of respectively supporting said driving and driven means with first and second process fluid bearings each disposed between the wall and the associated port so that fluid circulates over the respective process fluid bearings and magnetic means into the bores.

* * * * *